(12) United States Patent
Pourcyrous (10) Patent No.: US 10,732,761 B2
(45) Date of Patent: Aug. 4, 2020

(54) ARRANGING CONTENT BASED ON DETECTION OF A SUBSTANCE ON DISPLAY

(71) Applicant: PayPal, Inc., San Jose, CA (US)

(72) Inventor: Sam Pourcyrous, Santa Clara, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 15/833,324

(22) Filed: Dec. 6, 2017

(65) Prior Publication Data
US 2019/0171327 A1    Jun. 6, 2019

(51) Int. Cl.
| G06F 17/00 | (2019.01) |
| G06F 3/041 | (2006.01) |
| G06F 3/0488 | (2013.01) |
| G06F 3/0487 | (2013.01) |
| G06F 3/0482 | (2013.01) |
| G06F 3/042 | (2006.01) |
| G01N 21/94 | (2006.01) |

(52) U.S. Cl.
CPC .......... *G06F 3/0416* (2013.01); *G06F 3/0487* (2013.01); *G06F 3/04886* (2013.01); *G01N 21/94* (2013.01); *G06F 3/0418* (2013.01); *G06F 3/0421* (2013.01); *G06F 3/0482* (2013.01); *G06F 2206/1008* (2013.01); *G09G 2330/10* (2013.01)

(58) Field of Classification Search
CPC .. G06F 3/0416; G06F 3/04886; G06F 3/0482; G06F 2206/1008; G06F 3/0418; G06F 3/0421; G06F 3/0487; G09G 2330/10; G01N 21/94
See application file for complete search history.

(56) References Cited

U.S. PATENT DOCUMENTS

| 8,373,679 | B2 | 2/2013 | Gepner et al. | |
|---|---|---|---|---|
| 8,988,363 | B2* | 3/2015 | Homma | G06F 3/0235 345/173 |
| 9,207,804 | B2* | 12/2015 | Cudak | G06F 3/0418 |
| 10,067,606 | B2* | 9/2018 | Barat | G06F 3/04883 |
| 2007/0035524 | A1* | 2/2007 | Hyatt | G06F 1/1626 345/173 |
| 2007/0081739 | A1* | 4/2007 | Wilbrink | G09G 3/20 382/275 |
| 2007/0198950 | A1* | 8/2007 | Dodge | G06F 3/0481 715/815 |
| 2008/0231604 | A1* | 9/2008 | Peterson | G06F 3/04886 345/173 |
| 2010/0123665 | A1* | 5/2010 | Birkler | G06F 3/0421 345/173 |
| 2010/0321316 | A1* | 12/2010 | Homma | G06F 3/0235 345/173 |

(Continued)

*Primary Examiner* — Cesar B Paula
*Assistant Examiner* — James H. Blackwell
(74) *Attorney, Agent, or Firm* — Haynes and Boone, LLP (57) ABSTRACT

A computer system identifies a presence of a substance in a first location of a display screen of the computing device. In response to the identifying the presence of the substance in the first location of the display screen, the computer system causes one or more elements of a content to be displayed in a second location of the display screen, wherein the one or more elements were initially displayed in the first location.

20 Claims, 5 Drawing Sheets

(56) References Cited

U.S. PATENT DOCUMENTS

| | | | | |
|---|---|---|---|---|
| 2012/0162144 A1* | 6/2012 | Fahraeus | ............... | G06F 3/0418 |
| | | | | 345/178 |
| 2013/0100037 A1* | 4/2013 | Mabie | ................... | G06F 3/0418 |
| | | | | 345/173 |
| 2014/0146070 A1* | 5/2014 | Liu | ........................ | G09G 5/003 |
| | | | | 345/589 |
| 2014/0152583 A1* | 6/2014 | Bastide | ................. | G06F 3/0488 |
| | | | | 345/173 |
| 2014/0253494 A1* | 9/2014 | Jiang | .................... | G06F 3/0418 |
| | | | | 345/174 |
| 2014/0320437 A1* | 10/2014 | Kang | ..................... | G09G 5/373 |
| | | | | 345/173 |
| 2015/0193074 A1* | 7/2015 | Cudak | ................... | G06F 3/0418 |
| | | | | 345/173 |
| 2016/0092009 A1* | 3/2016 | Wu | ........................ | G06F 3/0418 |
| | | | | 345/173 |
| 2016/0179765 A1* | 6/2016 | Landau | ................. | G06F 17/217 |
| | | | | 715/251 |
| 2016/0299616 A1* | 10/2016 | Crowther | ............... | G06F 1/1643 |
| 2016/0328084 A1* | 11/2016 | Barat | ..................... | G06F 3/0418 |
| 2017/0102926 A1* | 4/2017 | Chakra | ..................... | G06F 8/38 |
| 2017/0115235 A1* | 4/2017 | Ohlsson | ................. | G06F 3/0418 |
| 2018/0029563 A1* | 2/2018 | Beloe | ................. | B60H 1/00785 |
| 2018/0232506 A1* | 8/2018 | Kumar | ................. | G06F 21/629 |

\* cited by examiner

ARRANGING CONTENT BASED ON DETECTION OF A SUBSTANCE ON DISPLAY

BACKGROUND

The present disclosure relates generally to arranging content on a display screen, and more particularly to arranging content on a display screen based on detecting a substance on the display screen.

Today, with the sheer number of electronic devices that users are exposed to, users often are taking their devices and using their devices everywhere. Oftentimes, this leads to devices being exposed to certain elements, such as food and water. For example, a user may often have his or her smartphone on the table while eating, which can lead to the device being more susceptible to spills. When a display screen is covered or has a foreign object, such as a liquid on top of it, it may not be able to receive input from the user with the same level of accuracy as normal. This can lead to issues with regard to the usage of the device.

DESCRIPTION OF EMBODIMENT(S)

Embodiments of the present disclosure provide a system, method, and program product. A computer system identifies a presence of a substance in a first location of a display screen of the computing device. In response to the identifying the presence of the substance in the first location of the display screen, the computer system causes one or more elements of a content to be displayed in a second location of the display screen, wherein the one or more elements were initially displayed in the first location.

In the example embodiment, the present disclosure describes a solution that displays content on a display screen of a computing device. The present disclosure describes detecting a substance, such as a liquid, on the display screen, and furthermore, identifying the location of the substance. The present disclosure further describes arranging the content being displayed to avoid locations where the substance has been detected. In the example embodiment, by arranging the content to avoid locations where the substance has been detected, the present solution allows a user's input to be received by the device in a clear and efficient manner. For example, in certain cases, when water is present on a display screen, input via a display touchscreen may not be received by the device due to interference from the water on the screen. Arranging content to be in parts of the display screen where there is no water present may allow the user to provide input without any interference.

Embodiments of the present disclosure will now be described in detail with reference to the accompanying Figures.

Figure 1:
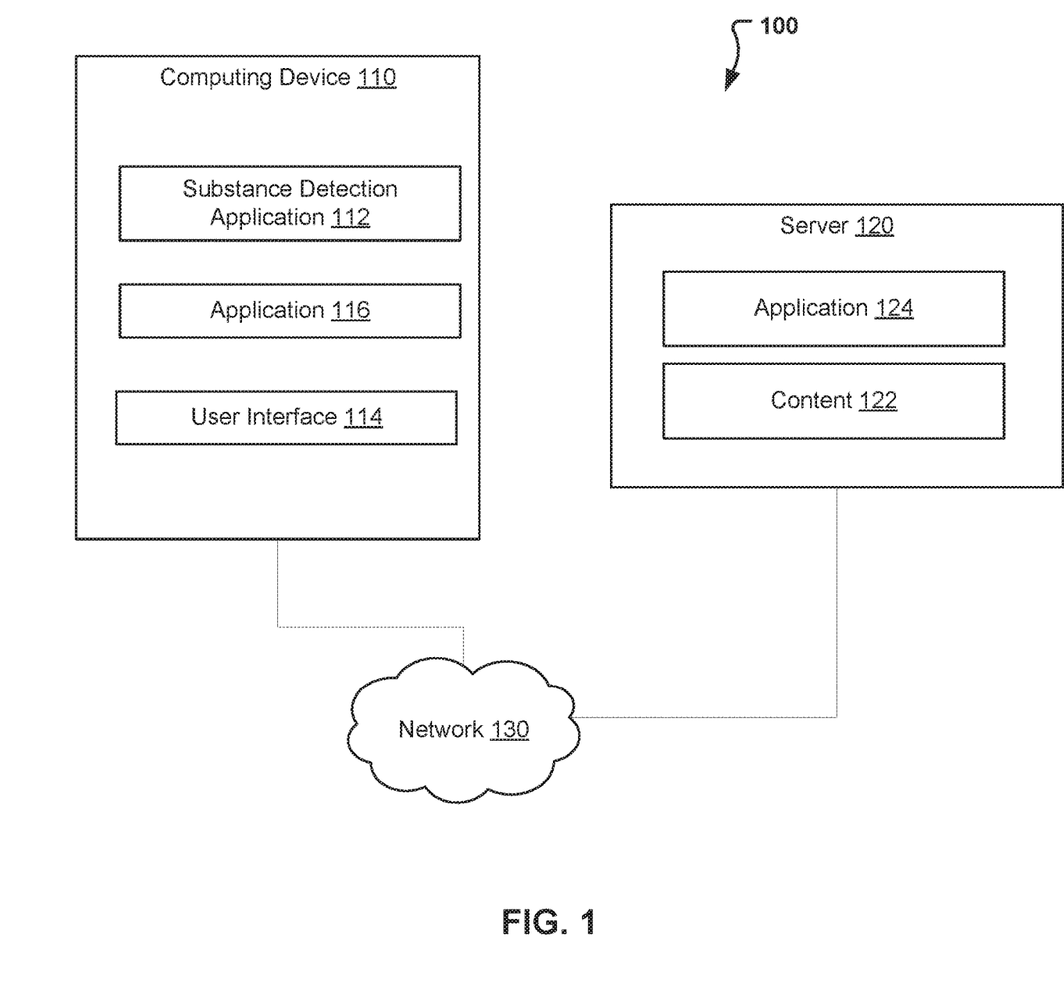
FIG. 1 illustrates a substance detection system, in accordance with an embodiment.

FIG. 1 illustrates substance detection system 100, in accordance with an embodiment. In the example embodiment, substance detection system 100 includes computing device 110 and server 120 all interconnected via network 130, In the example embodiment, network 130 is the Internet, representing a worldwide collection of networks and gateways to support communications between devices connected to the Internet. Network 130 may include, for example, wired, wireless or fiber optic connections. In other embodiments, network 130 may be implemented as an intranet, a local area network (LAN), or a wide area network (WAN). In general, network 130 can be any combination of connections and protocols that will support communications between computing devices, such as between computing device 110 and server 120.

Server 120 includes content 122. Server 120 may be a desktop computer, a laptop computer, a tablet computer, a mobile device, a handheld device, a thin client, or any other electronic device or computing system capable of receiving and sending data to and from other computing devices, such as computing device 110, via network 130. Although not shown, optionally, server 120 can comprise a cluster of servers executing the same software to collectively process requests as distributed by a front-end server and a load balancer. In the example embodiment, server 120 is a server that supports application 124. Server 120 is described in more detail with reference to FIG. 5.

In the example embodiment, application 124 is a server-side application, such as an e-commerce application, a financial application, a media application, or any other application, that is capable of communicating with one or more client-side applications, such as application 116, and further capable of processing requests, such as a request for content. Furthermore, application 124 is capable of transmitting information, such as content to client-side devices via network 130. Application 124 is described in further detail with regard to FIGS. 2 through 4.

In the example embodiment, content 122 may be a textual, video, audio, and/or any other type of content that may be transferred to another computing device, such as computing device 110, by application 124. Content 122 is described in more detail with reference to FIGS. 2 through 4.

Computing device 110 includes substance detection application 112, application 116, and user interface 114. In the example embodiment, computing device 110 is a computing device such as a smartphone, however in other embodiments, computing device 110 may be a desktop computer, a laptop computer, a tablet computer, a handheld device, a thin client, or any other electronic device or computing system capable of receiving and sending data to and from other computing devices, such as server 120, via network 130. Computing device 110 is described in more detail with reference to FIG. 5.

In the example embodiment, application 116 is a client-side application, such as a web browser, an e-commerce application, a financial application, a media application, or any other application, that is capable of communicating with a server-side application, such as application 124, and retrieving content, such as content 122. Furthermore, application 116 may utilize user interface 114 to display the retrieved content to a user of computing device 110. Application 116 and user interface 114 are described in further detail with regard to FIGS. 2 through 4, In the example embodiment, substance detection application 112 is an application that is capable of detecting a substance on a display screen of computing device 110, and based on detecting the substance on the display screen of computing device 110, substance detection application 112 is further capable of arranging (or re-arranging) content being displayed on computing device 110 so that the content is not displayed directly below the detected substance. Substance detection application is described in further detail with regard to FIGS. 2 through 4.

Figure 2:
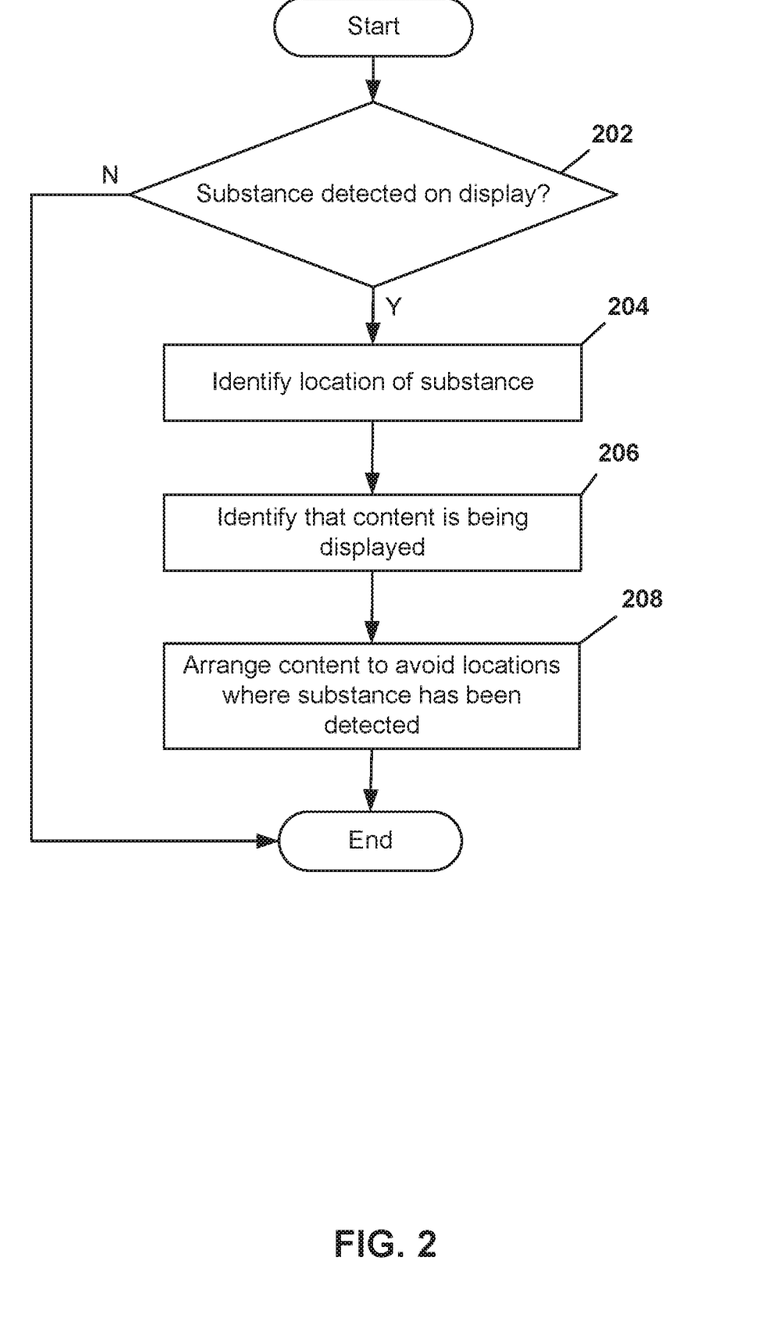
FIG. 2 is a flowchart illustrating the operations of the substance detection application of FIG. 1 in detecting whether a substance is on a display screen and based on detecting that there is a substance on the display screen, arranging the displayed content, in accordance with an embodiment.

FIG. 2 is a flowchart illustrating the operations of substance detection application 112 in detecting whether a substance is on a display screen and based on detecting that there is a substance on the display screen, arranging the displayed content, in accordance with an embodiment. In the example embodiment, substance detection application 112 detects whether there is a substance on the display (decision 202). In the example embodiment, substance detection application 112 may utilize one or more sensors (such as for example, capacitive touch sensors, resistive touch sensors, infrared touch sensors, and the like), to detect that there is something making contact with the display screen or to determine that a pressure or weight is being applied to a portion of the display screen for at least a threshold period of time. For example, substance detection application 112 may determine whether an additional pressure or weight is being applied to an area of the display screen for at least 5 seconds (an example of the threshold period of time) in order to distinguish between a substance on the screen and the user providing input by touching the display screen. In other embodiments, substance detection application 112 may calculate whether the light refraction as it reaches the display screen by utilizing one or more sensors on computing device 110 in order to determine if there is a substance, such as a liquid presence on the display screen. In these other embodiments, substance detection application 112 may determine whether the lights refracts as it reaches a plurality of areas on the display screen of computing device 110, so the specific locations of the substance on the display screen can be determined. For example, substance detection application 112 may determine whether the light refracts as it reaches each area of the display screen to identify whether there is a substance on the display screen. If a substance, such as a liquid is present on the display screen, light may bend as it passes through the liquid, therefore, based on determining that the light refracts in an area, substance detection application 112 may determine that a substance is present on the area of the display screen.

In another example, substance detection application 112 may utilize one or more sensors to detect that a certain percentage (a threshold percentage) of light is being blocked in a specific area of the display screen, for example, by a substance. For example, substance detection application 112 may compare the detected light levels for each specific area of the display screen and determine if any area experiences a lower level of detected light. In other words, substance detection application 112 may compare the detected light level at a first location to a detected light level at a second location, and if it is determined the detected light level at the first location is a threshold percentage or more lower than the detected light level at the second location, substance detection application 112 may determine that there is a substance on the first location of the display screen. Based on this detection, substance detection application 112 may determine that a substance is present on the specific area of the display screen. In a further example, substance detection application 112 may first identify, based on detecting a pressure or weight being applied on a specific portion of the display screen, that there may be a substance in the specific portion of the display screen. In this example, substance detection application 112 may further determine that light refracts (or whether a certain percentage of light is being blocked) for each of a plurality of areas in the specific portion of the display screen in order to determine whether there is a substance on the display screen.

If substance detection application 112 determines that a substance has not been detected on the display screen of computing device 110 (decision 202, "NO" branch), substance detection application 112 continues to monitor for substances on the display screen of computing device 110. If substance detection application 112 determines that a substance has been detected on the display screen of computing device 110 (decision 202, "YES" branch), substance detection application 112 identifies the location of the substance within the display screen as described above. In the example embodiment, as stated above, in detecting whether there is a substance on the display screen of computing device 110, substance detection application 112 may check one or more specific areas of the display screen, and utilize this information to determine the location(s) of the substance on the display screen.

In the example embodiment, substance detection application 112 identifies that content is being displayed (step 206). In the example embodiment, substance detection application 112 identifies that content is being displayed by communicating with an application that is performing the displaying, for example, application 116. For example, application 116 may communicate a request to application 124, via network 130, and in response to the request, application 124 may transmit content 122 to application 116. Furthermore, upon receiving content 122, application 116 may display content 122 to the user of computing device 110, via user interface 114. In this example, substance detection application 112 may detect that content 122 is being displayed by way of being fully or partially integrated with application 116. In other embodiments, substance detection application 112 may detect that content 122 is being displayed by monitoring applications on computing device 110 and/or communicating with the operating system of computing device 110. In further embodiments, substance detection application 112 may receive a notification from application 116 upon reception and display of content 122.

Substance detection application 112 arranges the displayed content 122 so that content is not displayed directly underneath areas where a substance has been detected (step 208), In the example embodiment, the term content may refer to text, user interface elements, graphical content, or any other content that is not a blank space. For example, a blank white space in between two selectable buttons may not be considered content, however, the two selectable buttons may be considered content. Furthermore, in the example embodiment, substance detection application 112 may communicate with the operating system of computing device 110 and determine based on the display screen, which locations of the display screen are currently displaying content. Furthermore, substance detection application 112 may cross-reference the locations that are currently displaying content with the locations on the display screen corresponding to the detected substance(s). For example, if substance detection application 112 determines that a user interface element is displayed on area A of the display screen, and further determines that area A of the display screen also has a substance on it, substance detection application 112 may arrange (re-arrange) the user interface element to be displayed in area B of the display screen where no substance is located. Therefore, the user may be able to interact with the user interface element without the substance on the display screen interfering with any user input.

Furthermore, in one or more embodiments, substance detection application 112 may identify specific portion of the content being displayed. For example, substance detection application may analyze the type of content being displayed and then determine whether or not to re-arrange the content, partially based on the content type. For example, substance detection application 112 may re-arrange content corresponding to a selectable button if the content corresponds to a location on the display screen that contains a substance, but may not re-arrange text content (that does not correspond to a selectable user interface element). Therefore, in these one or more embodiments, along with identifying a location of the substance and identifying the content that is being displayed, as described above, substance detection application 112 may determine the content type for each portion of content, and further take the content type into content when determining whether to re-arrange the content to avoid locations on the display screen where a substance has been detected.

Furthermore, in additional embodiments, substance detection application 112 may identify that a substance is on the display screen and further identify the location or locations of the substance prior to a content being displayed on the display screen of computing device 110. For example, substance detection application 112 may identify that a substance is on the display screen in area A, and further may communicate with application 116 and determine that content 122 is being retrieved from server 120. In this example, substance detection application 112 may utilize application 116 (by communicating with application 116) to arrange content 122 to avoid displaying any of content 122 in area A, or alternatively to avoid displaying any selectable user interface elements of content 122 in area A. In another example, substance detection application 112 may arrange content 122 to avoid displaying any of content 122 in area A or to avoid displaying any selectable user interface elements of content 122 in area A. In these additional embodiments, rather than re-arranging the content after it has been displayed, substance detection application 112 may identify the substance on the display screen and proactively arrange retrieved content to avoid locations corresponding to the substance on the display screen.

In further embodiments, substance detection application 112 may be present on a server device and may further be in communication with a client-side substance detection application located on computing device 110 to perform the steps discussed in FIG. 2. Alternatively, in additional embodiments, substance detection application 112 may be present on a server device and perform the steps discussed in FIG. 2 by communicating with one or more components of computing device 110 via network 130.

Figure 3:
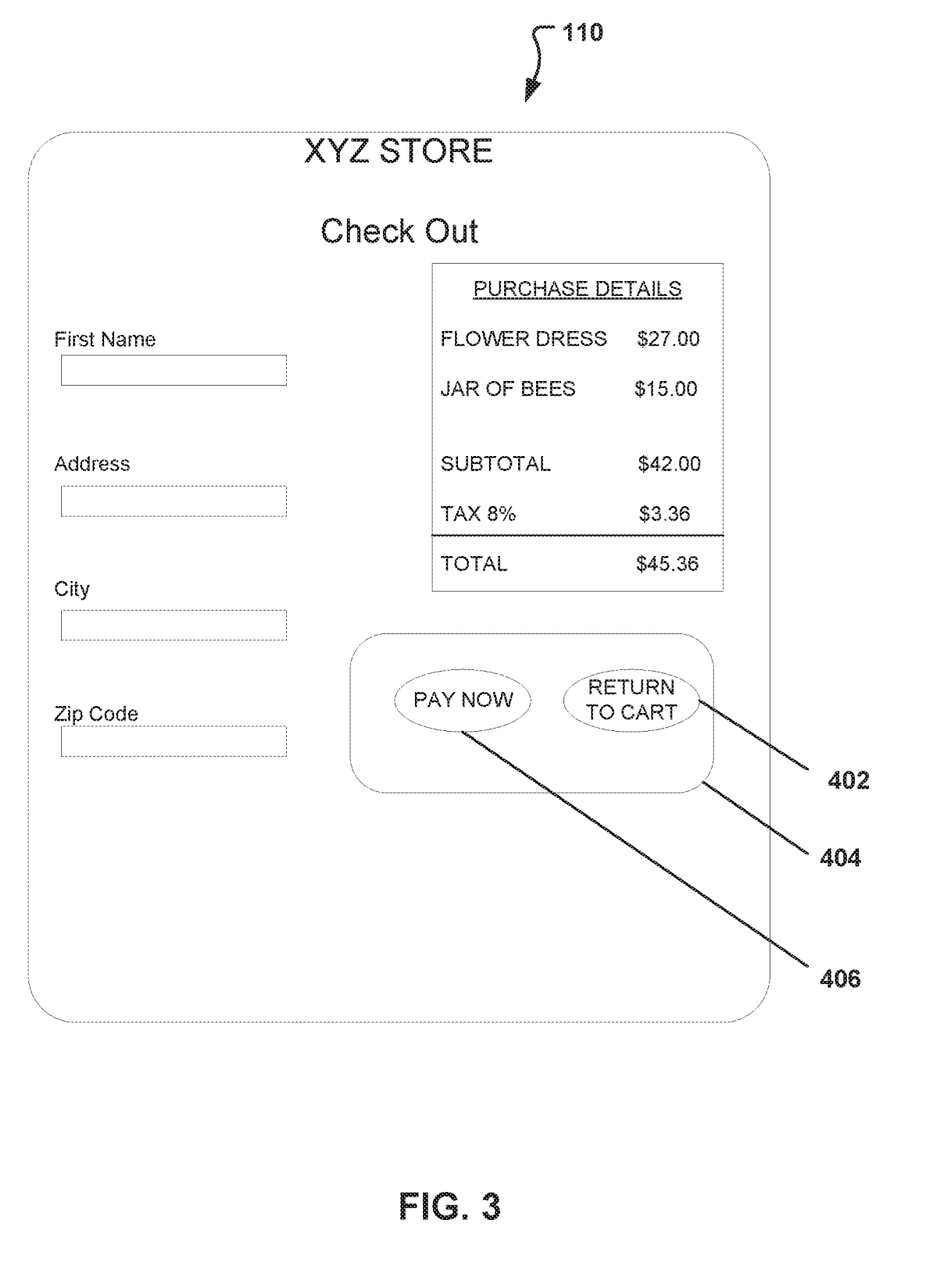
FIG. 3 is an illustration of the computing device of FIG. 1 prior to content being re-arranged to avoid a substance on the display screen, in accordance with an embodiment.

FIG. 3 is an illustration of computing device 110 prior to content being re-arranged to avoid a substance on the display screen, in accordance with an embodiment. In the example embodiment, the depicted display screen of computing device 110 includes a substance 404, selectable user interface element 402, and selectable user interface element 406. Furthermore, in the example embodiment, the depiction shown in FIG. 3 is prior to substance detection application 112 re-arranging content on the display screen of computing device 110 to avoid the location corresponding to substance 404.

Figure 4:
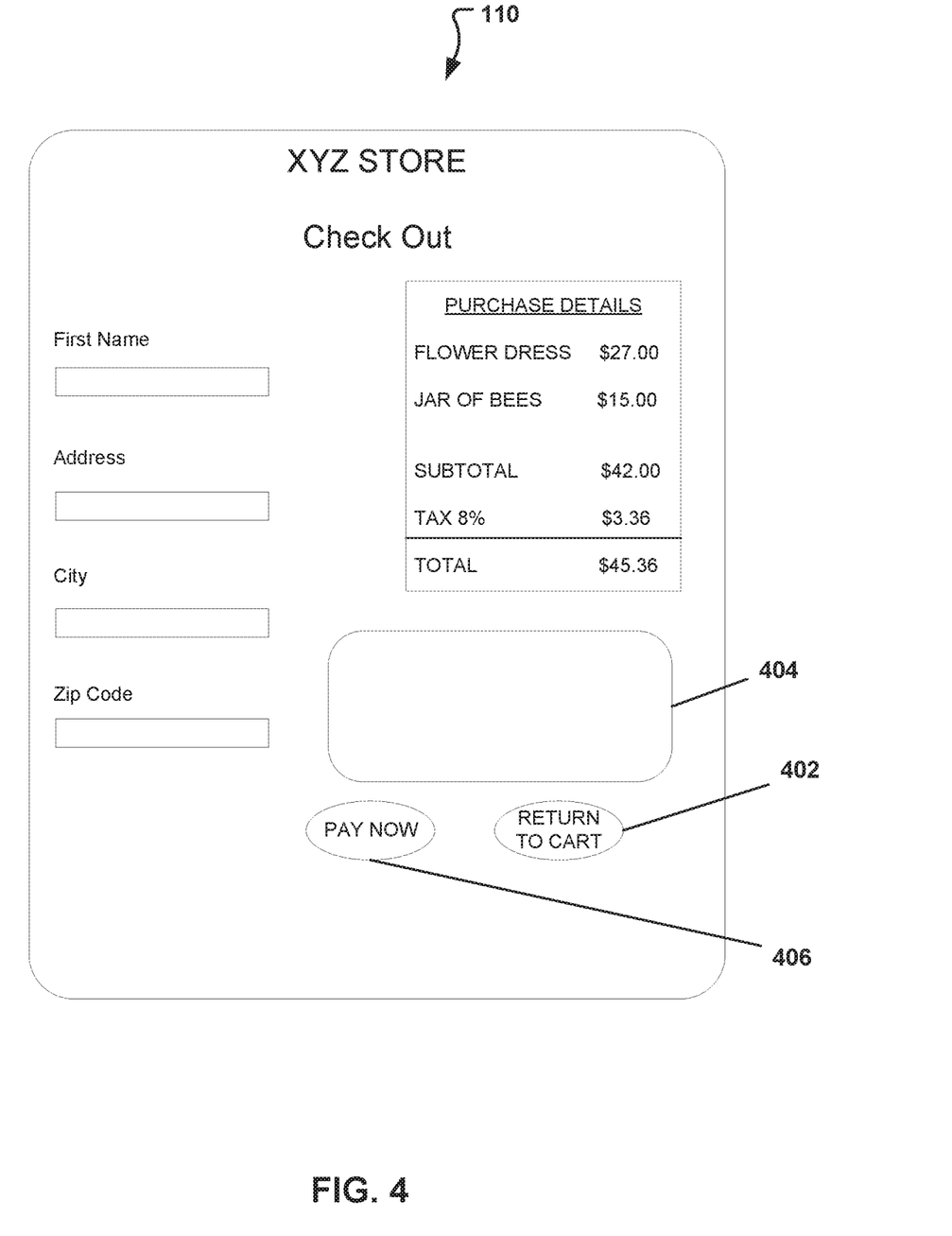
FIG. 4 is an illustration of the computing device of FIG. 1 after content has been re-arranged to avoid the detected substance on the display screen, in accordance with an embodiment.

FIG. 4 is an illustration of computing device 110 after content has been re-arranged to avoid the detected substance on the display screen, in accordance with an embodiment. In the example embodiment, the depicted display screen of computing device 110 includes substance 404, selectable user interface element 402, and selectable user interface element 406 after substance detection application 112 has re-arranged selectable user interface element 402 and selectable user interface element 406 to avoid the location corresponding to substance 404.

The foregoing description of various embodiments of the present disclosure has been presented for purposes of illustration and description. It is not intended to be exhaustive nor to limit the disclosure to the precise form disclosed. Many modifications and variations are possible. Such modifications and variations that may be apparent to a person skilled in the art of the disclosure are intended to be included within the scope of the disclosure as defined by the accompanying claims.

Figure 5:
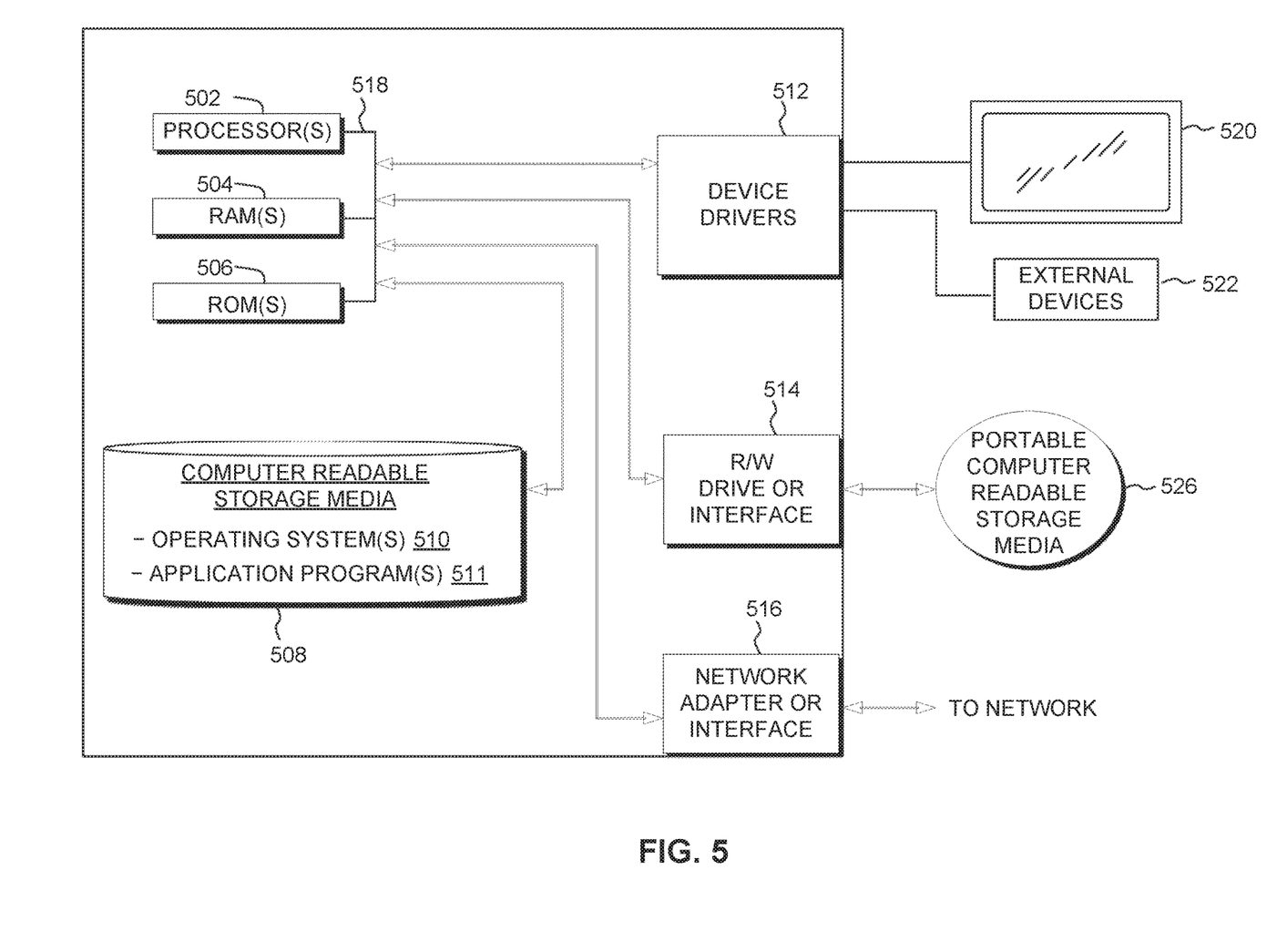
FIG. 5 is a block diagram depicting the hardware components of the substance detection system of FIG. 1, in accordance with an embodiment.

FIG. 5 depicts a block diagram of components of computing devices contained in substance detection system 100 of FIG. 1, in accordance with an embodiment. It should be appreciated that FIG. 5 provides only an illustration of one implementation and does not imply any limitations with regard to the environments in which different embodiments may be implemented. Many modifications to the depicted environment may be made.

Computing devices may include one or more processors 502, one or more computer-readable RAMs 504, one or more computer-readable ROMs 506, one or more computer readable storage media 508, device drivers 512, read/write drive or interface 514, network adapter or interface 516, all interconnected over a communications fabric 518. Communications fabric 518 may be implemented with any architecture designed for passing data and/or control information between processors (such as microprocessors, communications and network processors, etc.), system memory, peripheral devices, and any other hardware components within a system.

One or more operating systems 510, and one or more application programs 511, for example, substance detection application 112, are stored on one or more of the computer readable storage media 508 for execution by one or more of the processors 502 and by utilizing one or more of the respective RAMS 504 (which typically include cache memory). In the illustrated embodiment, each of the computer readable storage media 508 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing devices may also include a R/W drive or interface 514 to read from and write to one or more portable computer readable storage media 526. Application programs 511 on the computing devices may be stored on one or more of the portable computer readable storage media 526, read via the respective R/W drive or interface 514 and loaded into the respective computer readable storage media 508.

Computing devices may also include a network adapter or interface 516, such as a TCP/IP adapter card or wireless communication adapter (such as a 4G wireless communication adapter using OFDMA technology). Application programs 511 on the computing devices may be downloaded to the computing devices from an external computer or external storage device via a network (for example, the Internet, a local area network or other wide area network or wireless network) and network adapter or interface 516. From the network adapter or interface 516, the programs may be loaded onto computer readable storage media 508. The network may comprise copper wires, optical fibers, wireless transmission, routers, firewalls, switches, gateway computers and/or edge servers.

Computing devices may also include a display screen 520, and external devices 522, which may include, for example a keyboard, a computer mouse and/or touchpad. Device drivers 512 interface to display screen 520 for imaging, to external devices 522, and/or to display screen 520 for pressure sensing of alphanumeric character entry and user selections. The device drivers 512, R/W drive or interface 514 and network adapter or interface 516 may comprise hardware and software (stored on computer readable storage media 508 and/or ROM 506).

The programs described herein are identified based upon the application for which they are implemented in a specific embodiment. However, it should be appreciated that any particular program nomenclature herein is used merely for convenience, and thus the disclosure should not be limited to use solely in any specific application identified and/or implied by such nomenclature.

Based on the foregoing, a computer system, method, and computer program product have been disclosed. However, numerous modifications and substitutions can be made without deviating from the scope of the present disclosure. Therefore, the various embodiments have been disclosed by way of example and not limitation.

Various embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computing device, comprising:
    a non-transitory memory; and
    one or more hardware processors coupled to the non-transitory memory and configured to read instructions from the non-transitory memory to cause the computing device to perform operations comprising:
        determining that there is a refraction of light through a substance in a first location on a display screen as the light approaches the display screen; determining that a first element of content displayed in the first location of the display screen is obscured by an area of the substance and that the first element of content includes a selectable payment submission button;
        in response to the determining that the first element of content displayed in the first location is obscured by an area of the substance and that the first element of the content includes the selectable payment submission button, moving the first element of the content to be displayed in a second location of the display screen unobscured by the substance; and
        rearranging a second element of the content to be displayed in the first location, wherein the second element comprises non-active user interface elements.

2. The computing device of claim 1, wherein the determining that there is the refraction of light includes:
    determining a level of detected light corresponding to one or more locations on the display screen, wherein the one or more locations on the display screen does not include the first location;
    determining a level of detected light corresponding to the first location; and
    determining that the level of detected light corresponding to the first location is a threshold percentage lower than the level of detected light corresponding to the one or more locations on the display screen.

3. The computing device of claim 2, wherein the one or more locations includes the second location.

4. The computing device of claim 1, wherein the operations further comprise:
    identifying a presence of a second substance in a third location of the display screen of the computing device;
    identifying that a second content displayed in the third location does not include another selectable button; and
    in response to the identifying that the second content displayed in the third location does not include the another selectable button, continuing to display the second content in the third location.

5. The computing device of claim 1, wherein the substance comprises a liquid.

6. The computing device of claim 5, wherein the substance is water.

7. The computing device of claim 1, wherein the determining that the first element of content displayed in the first location of the display screen is obscured by the substance comprises cross-referencing a presence of the substance on the first location with a display location communicated from an application of the computing device that controls content display.

8. The computing device of claim 1, wherein the content comprises a check-out user interface for an online store.

9. A non-transitory machine-readable medium having stored thereon machine-readable instructions executable to cause a machine to perform operations comprising:
    identifying a presence of a substance on a first location of a display screen of a computing device;
    determining that a first element of content displayed in the first location of the display screen is obscured by the substance;
    in response to the determining that the first element of content displayed in the first location of the display screen is obscured, determining that the first element includes a selectable payment submission button;
    in response to (i) the identifying the presence of the substance, (ii) the determining that the first element of content displayed in the first location of the display screen is obscured by the substance, and (iii) the determining that the first element includes the selectable payment submission button, causing the first element of content to be displayed in a second location of the display screen, wherein the first element is not displayed underneath an area of the substance in the second location; and
    rearranging a second element of the content to be displayed in the first location, wherein the second element comprises a non-active user interface element.

10. The non-transitory machine-readable medium of claim 9, wherein the identifying includes determining that there is a refraction of light through the substance as the light approaches the display screen.

11. The non-transitory machine-readable medium of claim 9, wherein the identifying includes:
    determining a level of detected light corresponding to one or more locations on the display screen, wherein the one or more locations on the display screen does not include the first location;
    determining a level of detected light corresponding to the first location; and
    determining that the level of detected light corresponding to the first location is a threshold percentage lower than the level of detected light corresponding to the one or more locations on the display screen.

12. The non-transitory machine-readable medium of claim 11, wherein the one or more locations includes the second location.

13. The non-transitory machine-readable medium of claim 9, wherein determining that the first element of content displayed in the first location of the display screen is obscured by the substance comprises communicating with an application of the computing device, wherein the application controls displaying of the content.

14. The non-transitory machine-readable medium of claim 9, wherein the content comprises a check-out user interface for an online store.

15. The non-transitory machine-readable medium of claim 9, wherein the substance is water.

16. A method, comprising:
   determining that there is a refraction of light through a substance in a first location on a display screen of a computing device as the light approaches the display screen;
   determining that one or more elements of content displayed in the first location is obscured by an area of the substance and that the one or more elements includes a selectable payment submission button;
   in response to the determining that the one or more elements of content displayed in the first location is obscured by the substance and that the one or more elements includes the selectable payment submission button, moving the one or more elements of the content to be displayed in a second location of the display screen unobscured by the substance;
   identifying a presence of a second substance in a third location of a display screen of the computing device;
   identifying that a second content displayed in the third location does not include a second selectable button; and
   in response to the identifying that the second content displayed in the third location does not include the second selectable button, continuing to display the second content in the third location.

17. The method of claim 16, wherein the determining that there is the refraction of light includes:
   determining a level of detected light corresponding to one or more locations on the display screen, wherein the one or more locations on the display screen does not include the first location;
   determining a level of detected light corresponding to the first location; and
   determining that the level of detected light corresponding to the first location is a threshold percentage lower than the level of detected light corresponding to the one or more locations on the display screen.

18. The method of claim 17, wherein the one or more locations includes the second location.

19. The method of claim 16, further comprising communicating with an application of the computing device, wherein the application controls displaying of the content, and wherein the determining the one or more elements of content displayed in the first location is obscured by the substance is based on a communication with the application.

20. The method of claim 16, wherein the content comprises a check-out user interface for an online store.

* * * * *